United States Patent [19]

Wanzenberg et al.

[11] Patent Number: 4,776,749
[45] Date of Patent: Oct. 11, 1988

[54] ROBOTIC DEVICE

[75] Inventors: Fritz W. Wanzenberg, Larchmont, N.Y.; Richard L. Grover, Whittier, Calif.

[73] Assignee: Northrop Corporation, Hawthorne, Calif.

[21] Appl. No.: 843,887

[22] Filed: Mar. 25, 1986

[51] Int. Cl.$^4$ ............................................... B25J 9/12
[52] U.S. Cl. ......................................... 414/680; 29/39; 408/35; 408/236; 408/237; 414/735; 414/736; 901/14; 901/23; 901/41
[58] Field of Search .............................. 901/23, 14, 41; 414/680, 728, 732, 735; 212/236; 408/35, 236, 237; 29/35.5, 39, 40, 41, 47

[56] References Cited

U.S. PATENT DOCUMENTS 4,407,625 10/1983 Shum ................................... 414/728
4,569,627 2/1986 Simunovic ........................... 414/735

FOREIGN PATENT DOCUMENTS

0202206 11/1986 European Pat. Off. ............. 901/14
1224137 4/1986 U.S.S.R. ................................. 901/23
2083795 3/1982 United Kingdom .................. 901/23
2173472 10/1986 United Kingdom .................. 901/14

Primary Examiner—Robert J. Spar
Assistant Examiner—P. McCoy Smith
Attorney, Agent, or Firm—Terry J. Anderson; Robert B. Block

[57] ABSTRACT

A robotic positioning device has a support structure and a tool implement holding member which is positional within the three dimensional space of the support structure. The tool implement holding member is connected to the support structure utilizing five positioning members. Each of these positioning members is connected to the tool implement holding member. Three of the positioning members are connected to the holding member at a first common center of rotation and the other two positioning members are connected to the holding member at a second common center of rotation. Each of the positioning members is attached to the support structure utilizing a connecting member which allows for the positioning member to freely pivot with respect to the support structure and additionally allows the member to move with respect to the support structure axially along an axis of the member. This is accomplished by moving the members axially toward or away from the support structure. Because of the movement of the individual members, any tool located on the tool implement holding member can be precisely located with respect to the support structure.

10 Claims, 4 Drawing Sheets

ROBOTIC DEVICE

RIGHTS OF THE GOVERNMENT

The United States Government has rights in this invention pursuant to Contract No. F33657-81-C-0067 between the Department of the Army and Northrop Corporation.

BACKGROUND OF THE INVENTION

This invention is directed to a robotic device capable of positioning a working implement in a precise and reproducible spatial location with respect to a reference of origin and dynamically repositioning said working implement at a further spatial location which is precisely and reproducibly located with respect to said reference of origin.

Machine tools and other devices exist for the manufacture of components having precise tolerances and precise shapes. Until very recently, these machine tools all required a human operator for their function. Other manufacturing techniques and technology such as welding, riveting or assembly also until very recently were impossible without a human to perform these functions.

With all tasks which require a human operator or a human technician, included in the costs associated with the task is the cost of the human labor. In many instances, the labor costs associated with any one task greatly overshadow all other costs associated with the task. Because of this, in the past, the cost of many manufactured items was directly dependent upon the labor costs.

Aside from economic considerations, human labor has other influences and consequences. Humans are dynamic animals. They have good days and they have bad days. They get ill, they get tired, and they are emotional. All of these factors come into play with respect to the quality and reproducibility of tasks performed by humans. Articles produced by a human operator in the morning when the operator is "fresh" may differ in quality from those produced by the same operator later on in the day, after the drudgery of the day's work has taken its toll on the performance of the human operator.

In order to remove the human operator and/or human technician from certain manufacturing and assembly tasks, certain existing manufacturing machinery has been automated. Examples of such automated machinery are machine tools which are controlled by a taped program with respect to execution of a sequence of operations. Certain of these machine tools have even been equipped with tool carousels to allow for utilization of different tools. While this represents a dramatic step forward toward automation of operation, the existing automated machines still are "dedicated" with respect to the tasks they can perform. A milling machine, whether or not it is automated, is still only capable of performing milling operations. It is static and stationary, requiring the work to be brought to it, and not it to the work.

For certain operations which in the past required a human technician, such as welding or assembly, a class of robotic devices have been developed. For the most part these robotic devices mimic the function of a human arm. They consist of a series of segments which are connected together about axes of rotation to form an articulated arm. Generally, the axes of rotation would be orthogonal in order to give the articulated arm the ability to move within three dimensional space. The arm segments extend from the base and have a working implement on the end of the arm distal from the base. The arm thus forms a cantilever between the base and the working implement.

While articulated arms represent great steps forward with respect to automating certain tasks, they are not without their problems and/or limitations. Because the arm is a cantilever supported at only one end on the base, the loads which the implement can carry or the force which the implement can apply are limited. Additionally, as the implement moves toward or away from the base the lever arm between the implement and the base is variable. This, along with several different axes of rotation within the articulated arm contributes to the difficulty of computer numerical control, "CNC", of these devices.

The variability of the lever arm of a cantilevered articulated arm also contributes to a loss of accuracy with respect to these devices. The accuracy of these devices is best when the lever arm is short. As the lever arm is elongated, the accuracy degrades. In addition, each time a point of rotation must be traversed in moving from one segment of the cantilevered arm to the next, a degradation of the accuracy of the device also occurs. Because the arm is cantilevered, there is a bending moment in each of the individual points of rotation. Since the degradation of the accuracy is cumulative, by the time one reaches the implement end of the arm the accuracy of the arm is severely compromised.

It is thus evident that while current automated machine tools are capable of highly accurate operations, they are expensive, immobile and dedicated devices. Further, while articulated arms can be utilized to perform functions not available with machine tools, they too are extremely expensive, complicated to program and have limited accuracy.

BRIEF DESCRIPTION OF THE INVENTION

In view of the above, it is a broad object of this invention to provide for a robotic structure capable of being fitted with a variety of implements for doing different manufacturing and machining processes. It is a further object to do this while still maintaining extremely high positional accuracy with respect to placement of these implements in three dimensional space. It is an additional object of this invention to provide a device which uses only simple tensile and compressive forces so as to limit the problems inherent with devices having bending moments. It is an additional object to provide a device which is capable of positioning a working implement throughout three hundred and sixty degrees of space with respect to a working structure.

These and other objects, as will become evident from the remainder of this specification, are achieved in a robotic device having a support structure and an implement element. At least two positioning members are attached to the implement element at a first position. At least two positioning members are attached to the implement at a second position. A further positioning member also attaches to the implement element. A first connecting means is utilized to connect the first positioning members to the support structure and a second connecting means is utilized to attach the second positioning members to the support structure. A further connecting means is utilized to attach the further positioning element to the support structure. The device further includes actuator means for independently moving at least either the first two positioning members or the second two positioning members axially along axes between the support structure and the implement element whereby the position of the implement element with respect to the support structure is controlled by the movement of the positioning members.

In an embodiment of the invention the first positioning members are attached to the implement element about a first common center of rotation as is the further member. The second positioning members are attached to the implement element about a second common center of rotation. Further each of the positioning members are attached to the support structure utilizing a gimbal means, and each of the positioning members are movable by the actuator means independently axially along axes between the implement element and the support structure to achieve both positioning of the implement element and maintaining its normality to a workpiece.

Further, these objects are achieved in a robotic device having a support structure and a tool carrier for supporting a working tool. A first triangular support is formed of first and second members and a portion of the support structure. Each of these first and second members are connected by connecting means to the support structure. A second triangular support is formed of third and fourth members and a further portion of the support structure. Each of the third and fourth members are connected by a connecting means to the support structure. The apex of the first triangular support where the first and second members join is attached to the tool carrier by a first coupling means and in a similar manner, the apex of the second triangular structure where the third and fourth members join is attached to the tool carrier by a second coupling means. An axial moving means is provided for independently axially moving the first and second members with respect to the support structure and the third and fourth members with respect to the support structure. A further means is operatively associated with both the support structure and the tool carrier further moving the tool carrier independently of the movement imparted to the tool carrier by the axial moving means.

In an embodiment of the invention, the further means includes a fifth member attaching to the tool carrier in association with the first coupling means and the connecting means for connecting the individual members to the support structure would each include a pivoting means and an axial movement means. The pivoting means provides for pivotal movement of the individual members with respect to the support structure and the axial movement means provides for axial movement of the individual members with respect to the support structure.

BRIEF DESCRIPTION OF THE DRAWINGS

This invention will be better understood when taken in conjunction with the drawings wherein.

The invention described in this specification and shown in the drawings utilizes certain principles and/or concepts as are set forth in the claims appended hereto. Those skilled in the mechanical arts will realize that these principles and/or concepts are capable of being utilized in a variety of embodiments which may differ from the exact embodiments utilized for illustrative purposes herein. In view of this, this inventions should not be construed as being limited solely to the illustrative embodiments but should only be construed in view of the claims.

DETAILED DESCRIPTION OF THE INVENTION

This invention is directed to a robotic device used for positioning of a working implement in precise locations and positions in three dimensional space. Because of certain principles inherent in the invention it can be utilized for many diverse machining and manufacturing processes ranging in scope from certain micro processes such as those utilized during integrated circuit manufacture to macro processes such as ship and aircraft building.

As will be evident from the illustrative embodiments, a working implement can be positioned in space with great accuracy which is independent of the spatial orientation of the implement with respect to a support structure. As will be discussed with respect to the illustrative embodiments, simple tensile and compressive forces are utilized to position the working implement. By utilizing only tensile and compression forces there are no bending moments such as those found in typical articulated arm robotic devices. The robotic device of the invention is capable of both manual control and computer numeric control (CNC), with CNC control preferred for total automation of the device.

Because there are no bending moments inherent in the robotic device of the invention, the robotic device of the invention is capable of achieving positional accuracies of the working implement many fold greater than present articulated arm robotic devices. Independent of the scale of the robotic device of the invention, i.e., whether it is being utilized in a micro or macro environment, high degrees of accuracy can be achieved. This accuracy is maintained throughout the "geometrical" range of the device irrespective of the positioning of the working implement with respect to a working surface.

With a conventional articulated arm robotic devices, reach of the arm is only approximately 100 inches, with reproducibility of plus or minus 0.010 inches, and absolute reproducibility of plus or minus 0.05 inches. A robotic device of the invention of the same scale would have a reach of over 1200 inches and an accuracy within that reach of plus or minus about 0.0002 inches and if a constant environment was utilized so as to mitigate temperature effects, this accuracy could be increased to plus or minus about 0.00002 inches.

Contrary to existing articulated arm robotic devices which must be fixly oriented in space in order to always account for the bending moments within the articulated arm, the robotic device of the invention is capable of being positioned within three dimensional space above, below or to any side of a working surface and still maintain the accuracy of the device. Further, the robotic device of the invention can be utilized in a dynamic mode maintaining this accuracy as the robotic device of the invention moves a working implement through three dimensional space as might be necessary during fabrication and assembly of a complex structure. The robotic device of the invention is capable of being utilized on both horizontal and vertical planes while maintaining tool normality of a working implement with respect to a working surface of a component.

Because the robotic device of the invention essentially serves as a positioning structure and is not dedicated to a single or related family of working implements, the robotic device of the invention is capable of a variety of machining, assembly and other operations depending upon the implement utilized. Because of the structure of the robotic device of the invention, machine tool accuracy can be achieved throughout the range of the device and all normal machine tool functions can be performed. Since the device is in fact not limited in size or space, it can be scaled up and equipped with appropriate working implements capable of performing complex assembly on large structures such as airplanes and ships.

Figure 6:
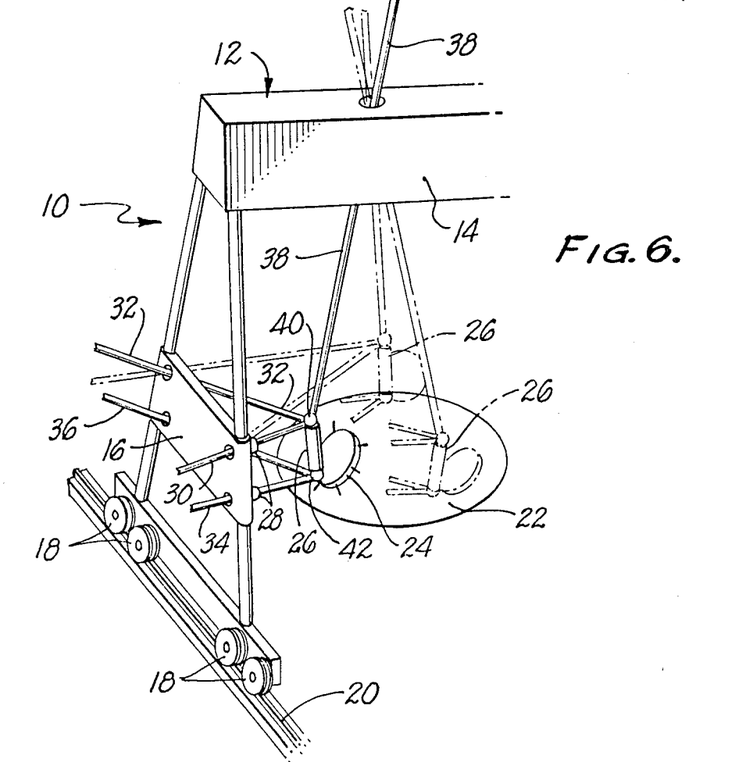
FIG. 6 is an isometric view of a further alternate embodiment of the invention showing certain components of the invention in solid line in a first spatial configuration and in phantom lines in further spatial configurations.

Prior to discussing the specific embodiments shown in FIGS. 1 and 2, the more general embodiment of FIG. 6 will be described to indicate certain overall features of the robotic device of the invention. In FIG. 6 a portion of a robotic structural device 10 is shown. The device 10 is shown utilizing a mobile gantry type structure generally depicted by the numeral 12. The mobile gantry 12 would include an overhead horizontal beam 14 and an appropriate vertical sidewall structure 16 as shown. A sidewall similar to sidewall 16 would support the other end of the beam 14. For simplicity of the drawings and this specification, however, the other wall is not shown, its function and structure being identical to that of the wall 16.

The wall 16 (and its mate on the other side of the beam 14) can be mounted on appropriate wheels such as wheels collectively identified by the numeral 18. The wheels 18 could ride on tracks such as tracks 20 shown in FIG. 6. As is shown in FIG. 6, the device 10 would be useful for machining and manufacturing operations on large structures.

The device 10 in FIG. 6 is shown working in several views in solid and phantom line on a working structure 22. A representational tool turret 24 is shown attached to the device 10. The tool turret 24 would of course include a variety of working tools located on it. Since tool turrets such as the turret 24 and working tools located thereon are known, a detailed description of these components is not deemed necessary for the understanding of this invention, it being sufficient to say that they would be appropriately mounted on the device 10 with the device 10 serving its most important and primary function of correctly positioning the working tools against the working structure 22 throughout three dimensional space with respect to the working structure 22.

A central tool post or implement element 26 is attached to the gantry 12 utilizing five positioning members. The individual positioning members are joined to the gantry 12 utilizing a like number of connecting members or connecting means collectively identified by the numeral 28. The positioning members can be thought of as occurring in three sets. These include the first set or upper set having positioning member 30 and positioning member 32 as members of this set. Below the first set is a second set composed of members 34 and 36. The final positioning member or further positioning member is positioning member 38. Positioning member 38 extends from the beam 14, whereas the other positioning members extend from the sidewall 16. Each of the positioning members 30, 32, 34, 36 and 38 are movably joined to the gantry 12 by their respective connecting member 28.

The positioning members 30, 32 and 38 are joined to the tool post implement 26 in the embodiment of FIG. 6 at a common center of rotation or coupling point 40 located on one end of the tool post implement 26. The other two positioning members, the positioning members 34 and 36 of the second set, are joined to the tool post implement at a second or further coupling point 42 formed on the other end of the tool post implement 26.

For the purposes of this specification, the attachment of the members 30, 32, 34, 36 and 38 to the tool post implement 26 was noted as being at coupling means, i.e. the coupling points 40 and 42 and the attachment of these members to the gantry 12 at connecting means, i.e. the connecting members 28. The different words "connecting" and "coupling" are used simply to differentiate whether the members 30, 32, 34, 36 and 38 are attaching to the structural support, i.e. the gantry 12, or to the tool post implement 26. The use of two different words "connecting" and "coupling" to describe the "movable" attachments is for descriptive reasons only to achieve clarity and easy of understanding of this specification as should not be thought of as being limiting.

As is evident in FIG. 6, at any one instance, a portion of each of the positioning members 30, 32, 34, 36 and 38 is located between the gantry 12 and the tool post implement 26 and a further portion of each of the respective members are located external of the gantry 12 that is they extend to the left or above the respective connecting members 28. The ratio of these "external portions" of the respective positioning members varies depending on the position of the tool post implement 26.

Each of the positioning members 30, 32, 34, 36 and 38 are pivotable with respect to the support structure, i.e., either the sidewall 16 or the beam 14 from which they extend. In addition, they also are axially movable with respect to those same support structures, the beam 14 and the sidewall 16, along the length or elongated axis of the positioning members 30, 32, 34, 36 and 38. Because of this, the tool post implement 26 is freely positional in three dimensional space within the gantry 12, and at the same time the tool post implement 26 can be held normal to, that is perpendicular to, whatever surface it might be working on irrespective of whether this surface is simple, complex, planar, arcuate or convoluted.

The two positioning members 30 and 32 of the first or upper set in conjunction with the portion of the sidewall 16 are triangulated to form a rigid structure. The same is true with respect to the positioning members 34 and 36 of the second or lower set in conjunction with a further portion of sidewall 16. The upper set of positioning members, members 30 and 32 and the further positioning member, positioning member 38, in conjunction with a portion of the gantry 14 extending through sidewall 16 and beam 14 are also triangulated.

The triangulation of the respective positioning members fixes the position of the tool post implement 26 with respect to the gantry 12 by the tension and compression vectors extending along the elongated axis of the respective positioning members. The positioning members 30, 32, 34, 36 and 38 connect to and extend between the coupling points 40 and 42 on the tool post implement 26 and the connecting members 28 on the the gantry 12 utilizing only those tension and compression vectors which extend along the elongated axis of the positioning members 30, 32, 34, 36 and 38.

Because the tool post implement 26 is in fact supported only by tension and compressional forces along the elongated dimension of the positioning members, great force can be exerted on the tool post implement 26 and a working tool attached thereto as might be necessary for certain manufacturing functions, as, for instance, drilling in titanium or other extremely hard materials. These same forces simply are not available in articulated arm devices because of the bending moments involved in those devices. At the same time, extremely delicate and precisely accurate movements in positioning of a working tool located on the tool post implement 26 can be achieved by elongating and foreshortening the portion of one or more of the positioning members 30, 32, 34, 36 and 38 located between the tool post implement 26 and the gantry 12.

For the sake of understanding the movement of the robotic devices of the invention, in specific reference to the device 10 of FIG. 6, if the positioning member 38 were mentally envisioned to be disconnected for a moment from the tool post implement 26 it is evident that the remaining positioning members 30, 32, 34 and 36 would be free to pivot or rotate with respect to the sidewall 16 about their respective connecting members 28. In the same manner, the positioning member 38 can also pivot within its connecting member 28 with respect to the beam portion 14 of the gantry 12.

In addition to this pivotal motion each of the positioning members 30, 32, 34, 36 and 38 are capable of extending or retracting along an axis axially passing along the elongated dimension of the positioning members 30, 32, 34, 36 and 38. For the purposes of defining the terminology of this specification this motion can be considered as being axial, linear or translational movement along the elongated axis of the respective members. This individual axial, linear or translational motion of any particular member when combined with the other members can result in either linear or rotational movement of the tool post implement 26 depending upon the combined motion of all of the members.

If members 32 and 36 are held so as to have a fixed length between the wall 16 and the tool post implement 26, when members 30 and 34 move in an outwardly linear or translational manner with respect to the wall 16 "elongating" them, i.e., the portion of each of the members 30 and 32 located between the tool post implement 28 and the sidewall 16 increases, the tool post implement 26 moves in an arcuate manner pivoting about the connecting members 28 connecting the positioning members 32, 36 and 38 to the gantry 12 and moving away from the connecting members 28 connecting the positioning members 30 and 34 to the gantry 12.

If the members 30 and 34 are "elongated" with respect to the wall 16 and at the same time the members 32 and 26 "forshortened" with respect to the wall and the member 38 follows this motion and maintains the tool post implement 26 at a constant height, this results in the tool post implement 26 moving parallel to the wall 16. Simultaneous "elongation" of members 30, 32, 34 and 36 at the same velocity results in movement of the tool post implement 26 perpendicular to the wall 16. The movement of any one of the members 30, 32, 34, 36 or 38 with respect to at least one other of the respective members can be at the same velocity or at a different velocity resulting in either constant or differential movement between the respective members.

As is shown in solid line in FIG. 6 the tool post implement 26 is held in one spatial configuration against a first portion of the working structure 22 and in the two phantom line views, the tool post implement 28 is held in further positions with respect to the working structure 22. In FIG. 6 in moving from the solid line view of the tool post implement 26 to the phantom line view shown in the right foreground, it can be seen that not only is the tool post implement 26 moved from left to right across the surface of the working surface 22, but at the same time it has been inclined with respect to a hypothetical vertical axis from about 15 degrees to the left of a vertical axis to approximately 15 degrees to the right of the same vertical axis. During actual use of the robotic device 10 shown in FIG. 6 this inclination and movement of the tool post implement 26 and a working tool attached thereto could be made in a dynamic manner while at all times holding the working implement against the working structure 22 to execute a machine or assembly function during movement.

It is thus evident that complex and precise movements can be achieved depending only upon lengthening and shortening the portion of the positioning members 30, 32, 34, 36 and 38 which extend between either the sidewall 16 or the beam 14 and the tool post implement 26. Thus the tool post implement 26 can be made to move parallel to the sidewall 16, can be made to move perpendicular to the sidewall 16, can be moved in a straight line which is at an angle to the sidewall 16, can be moved in an arcuate manner curving essentially horizontal to the sidewall 16, can be moved in an arcuate manner curving essentially vertical to the sidewall 16, can be raised or lowered with respect to the beam 14, or any combination of two or more of these movements. It is thus evident that any working tool located on the tool post implement 26 can be moved in simple or complex manners throughout the three dimensional space in the interior of the gantry 12.

Figure 1:
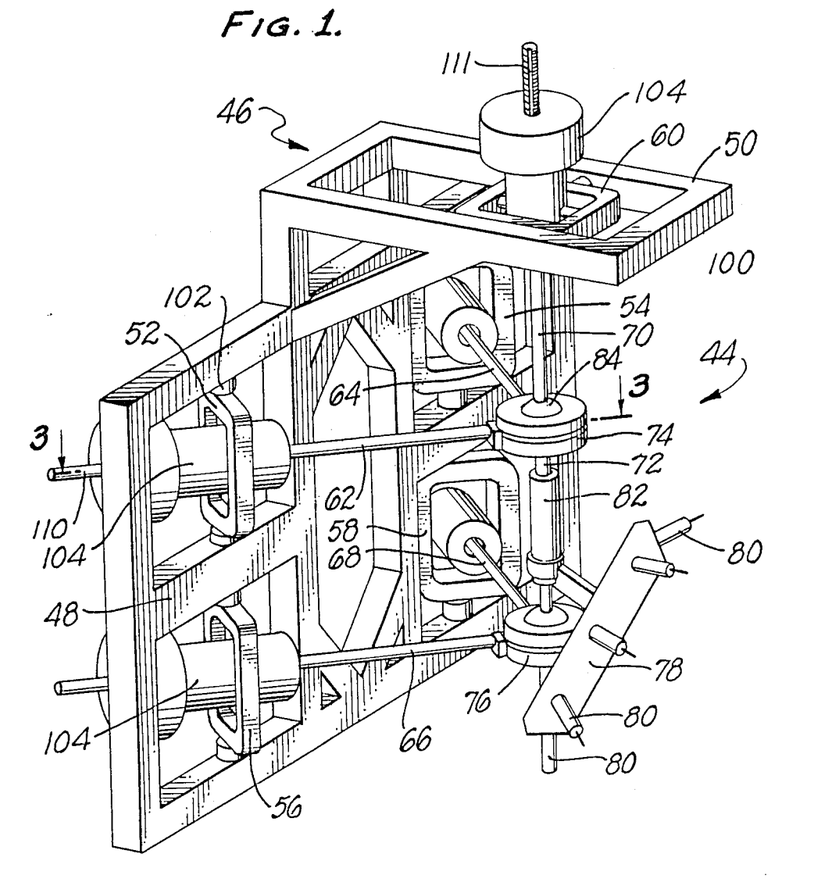
FIG. 1 is an isometric view of a first embodiment of the invention.

Referring now to FIG. 1 a further embodiment of the invention is described in detail. Depicted in FIG. 1 is a robotic device 44. Its operation is exactly the same as that of the device 10 of FIG. 6. The device 44 has a supporting structure generally defined by the numeral 46 composed of a cross braced wall 48 and a vertical braced extension 50. Five identical gimbals 52, 54, 56, 58 and 60 are appropriately suspended in the support structure 46. The gimbals serve as a portion of the connection means. As per the embodiment of FIG. 6, four of these gimbals, gimbals 52, 54, 56 and 58 are located in the wall 48 and the fifth gimbal, gimbal 60, in the vertical extension 50.

A first positioning member 62 is associated with the gimbal 50 and a second positioning member 64 is associated with the gimbal 54. In a like manner a third positioning member 66 is associated with gimbal 66 and a fourth positioning member 68 is associated with the gimbal 58. Finally, a further positioning member 70 is associated with gimbal 60. The positioning members 62, 64, 66, 68 and 70 are utilized to support a tool post 72.

Positioning members 60, 62, 64 and 70 attach to an upper common coupler 74 while the positioning members 66 and 68 attach to a lower common coupler 76. An appropriate tool turret or carousel 78 extends from the tool post 72. A plurality of tools collectively identified by the numeral 80 are located on the carousel 78. The tools 80 would be common machine tools as are standard in the art. Representationally depicted by cylinder 82 would be a variable speed tool motor and tool feed and retract mechanism. Insofar as these are only one of many different working implements which could be utilized with the robotic device 44, for the brevity of this specification these components are only depicted schematically. The other components of the robotic device 44 discussed in detail are utilized to position these working implements within three dimensional space.

The positioning members 62, 64 and 66 are connected about a common center of rotation within the upper coupler 74. The coupler of this embodiment is seen in greater detail in FIG. 4. On the lower end of positioning member 70 is a ball 84. The ball 84 is fixed to the lower end of the positioning member 70 so as to become an integral part thereof. The interior of the ball 84 is hollow with an opening into this hollow interior opening out of the lower pole of the ball 84. The tool post 72 extends upwardly through the opening in the lower pole of the ball 84 and terminates in an inner ball 86 which is positioned co-spherically within the hollow interior of the ball 84. Since both the balls 84 and 86 have the same common center, this allows for procession of the positioning member 70 with respect to the tool post 72.

Figure 4:
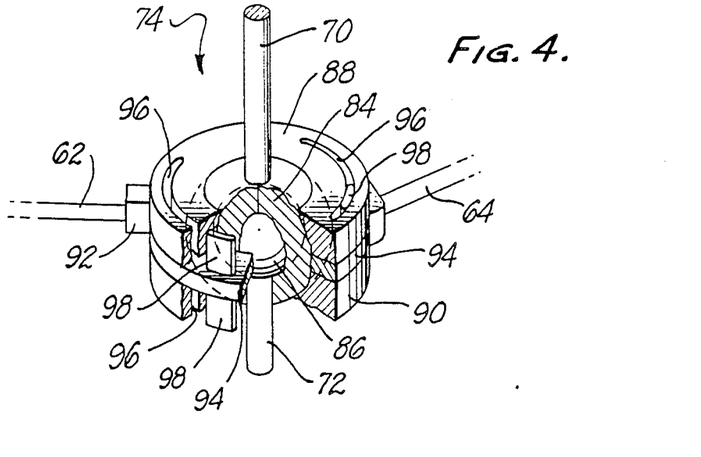
FIG. 4 is a fragmentary isometric view in partial section of a component found on the right hand side of FIG. 3.

Encircling the ball 84 are upper and lower disks 88 and 90, respectively, which are connected via a joining block 92 to positioning member 62. The interior of the disks 88 and 90 are spherical so as to fit around the ball 84 allowing the disks 88 and 90 and the joining member 62 attached thereto to also rotate about the common center of the balls 84 and 86.

A third, narrower disk, disk 94, is located between the two disks 88 and 90. The disk 94 is attached to the positioning member 64. The interior surface of the disk 94 is also spherical so as to fit around the outside surface of the ball 84 to connect the positioning member 64 to the remainder of the structure and allow it to rotate around the same common center of rotation as the positioning member 62 and the positioning member 70. The disks 88 and 90 each include grooves collectively identified by the numeral 96 located therein which receive projections collectively identified by the numeral 98 which project perpendicularly up or down from the upper and lower planar surfaces of the disk 94. The grooves 96 are sized to be slightly oversized with respect to the projections 98, allowing for rotation of the disk 94 between the disks 88 and 90. This results in stabilization of the total structure and maintenance of all of the components about about a common center of rotation while still allowing flexure of the positioning members 62 and 64 about the common center of rotation.

The thickness of the sandwich formed by the disks 88, 94 and 90 combined with the size of the ball 84, the size of the opening in the lower pole of the ball 84 and the arcuate angle of the grooves 96 can be conveniently made so as to allow for sufficient degrees of rotational freedom about the common center at which each of the four appendages, positioning members 62, 64 and 70 and tool post 72, attach to the upper coupler 74. Because the overall size of the robotic device 44 will be chosen with respect to the structure being worked on, i.e., from micro to macro, the exact degree of freedom for each appendage can be optimized. Typically 30 degrees of rotational freedom for each of the components attached at the upper coupler 74 depicted in FIG. 4 is sufficient for tool location in a fairly large three dimensional space volume adjacent to the support structure 46 of FIG. 1.

The lower coupler 76 will be formed in a manner similar to the upper coupler 74 except the tool post 72 would extend completely through the equivalent of the ball 84 and there would be no internal ball equivalent to ball 86. A rotating shaft would pass through tool post 72 from any actuating or driving mechanism as per the schematic depiction of cylinder 82 in FIG. 1 to an appropriate tool located below the lower coupler 76.

Figure 5:
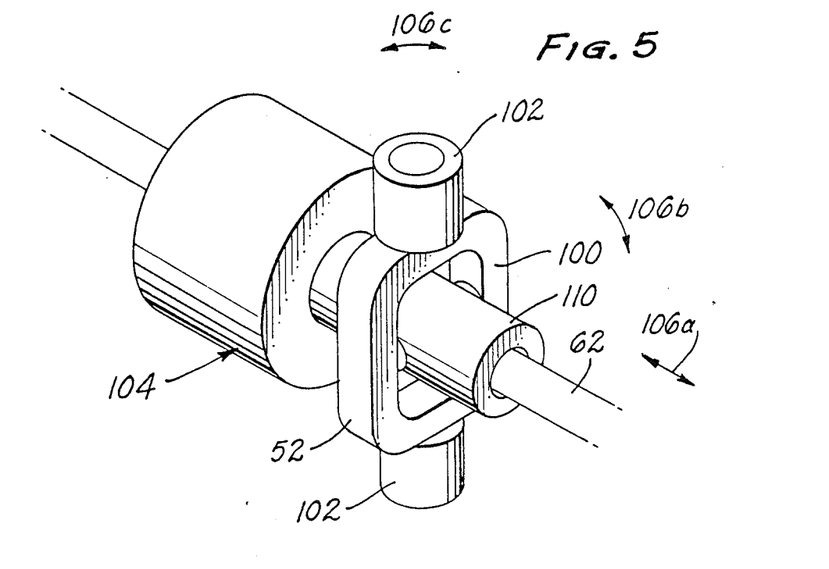
FIG. 5 is an isometric view of a component of the invention seen repeatedly used in FIG. 1 in five various locations within FIG. 1.

Referring now to FIG. 5, a gimbal, as for instance gimbal 52, is shown in greater detail. A gimbal yoke 100 is approrpiately journaled via vertical bearings 102 in the wall 48 of the support structure 46. Horizontally journaled to the yoke 100 is a schematically depicted actuator mechanism 104. In combination, the gimbal 52 and the actuator mechanism 104 comprise the connecting means for the positioning members, as for instance positioning member 62 shown in FIG. 5. The gimbal 52 of course would provide for pivotable movement of the positioning member 62 with respect to a support structure while the actuator mechanism 104 would provide for the previously described axial or translational movement, i.e. the elongating or foreshortening of the portion of any particular positioning member located between the connecting means and the appropriate coupling means on the tool post 72 or its equivalent such as the tool post implement 28.

As is apparent from viewing FIG. 5 the positioning member 62 can axially move with respect to the actuator mechanism 104 as is depicted by the double headed arrow 106a. Movement of the actuating mechanism 104 within the yoke 100 in combination with movement of the yoke 100 within the support structure 46 about the arcuate arrows 106b and 106c provide for pivoting in all directions about an imaginary center crosshair of the gimbal 52.

Figure 3:
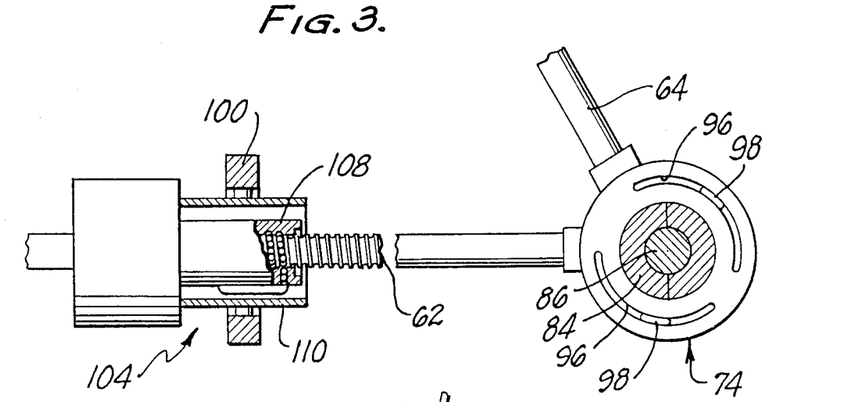
FIG. 3 is a plan view in partial section about the line 3—3 of FIG. 1.

In FIG. 3 the actuator mechanism 104 is shown in partial section along with the positioning member 62 and the upper coupler 74. Located within the actuator mechanism 104 is a recirculating ball nut 108. The positioning member 62 and the other positioning members are in fact shafts for such recirculating ball nuts. Insofar as recirculating ball nuts and shafts are commercially available and are known in the art a more detailed description of the same is not deemed necessary for understanding of this invention. It suffices to say that rotation of the ball nut 108 produces linear motion of the screw represented by the positioning member 62 to the left or to the right in FIG. 3.

Forming a further component part of the actuator mechanism 104 would be an appropriate servo motor for rotation of the recirculating ball nut 108. These too are commercial devices, and as such their operation and description is not included in this specificaton for brevity of the specification. Shown in FIG. 3, however, is how the actuator mechanism 104 is attached to the gimbal 52. This is done by mounting a servo motor stator 110 to the gimbal yoke 100. The servo motor stator 110 would be appropriately mounted at the the crosshair center of the gimbal 58. The servo motor stator 110, in turn, would support the rest of the actuator mechanism 104, including the recirculating ball nut 108, in the gimbal 52.

The recirculating ball nut 108 and its screw, positioning member 62, as well as other identical units utilized in the devices of this invention, are zero backlash devices providing for precise control of the linear motion of anything attached to the screw, i.e., the positioning member 62. These devices can provide for linear movement accuracies of 1 micron. If, in fact, greater accuracy of linear movement of the positioning member 62 with respect to the actuating mechanism 104 is desired, commercially available planetary roller screws can be substituted for the recirculating ball nuts 108. These provide for accuracies of 0.025 microns. Servo actuators, which also are commercially available, and which are utilized to drive the recirculating ball nut or the above described planetary rollers are susceptible to very sophisticated control utilizing computer numerical control (CNC). Other appropriate mechanical controls such as mechanical, electrical or hydraulic control of the servo actuating mechanism could be substituted. For the purposes of this specification an activator means is defined as the necessary standard components for producing axial, translational or linear movement of the positioning members, as for instance, the recirculating ball nut 108 in combination with the shaft, i.e., positioning member 62 and a servo actuator to move the same.

As is evident from FIG. 1 and FIG. 6 at any one time, as for instance for the positioning member 62, a portion of the positioning member 62 will be located between the coupling means, i.e., the upper coupler 74 and the connecting means, i.e., the gimbal 52 and the actuator mechanism 104 attached thereto and a further portion of the positioning member 62 will be located beyond the connecting means as for instance the extension 110 of the positioning member 62 seen in FIG. 1. Depending upon the location of the coupling means, i.e., the upper coupler 74, to which the positioning member is attached, the portion of the positioning member located between the coupling means and the connecting means and the portion of the positioning member located external of the connecting means will be variable. In any event, the portion of the positioning member between the coupling means and the connecting means will elongate or foreshorten depending upon activation of the actuator mechanism 104. At the same time the positioning member 62 will be freely pivotal with respect to the support structure as per the rotational freedom provided to the positioning member by the gimbal means represented by the gimbal 60.

Inherent in the embodiment of FIG. 1 is the keying or indexing against random rotation of the positioning members 62, 64, 66 and 68 about their elongated axes by the couplers 74 and 76. The positioning member 70 can be indexed in a similar manner by a simple keyway or spline extending along its elongated axis which is indexed to the servo motor stator 110. A portion of such a keywall 111 is shown on the upper end of member 70 in FIG. 1.

Figure 2:
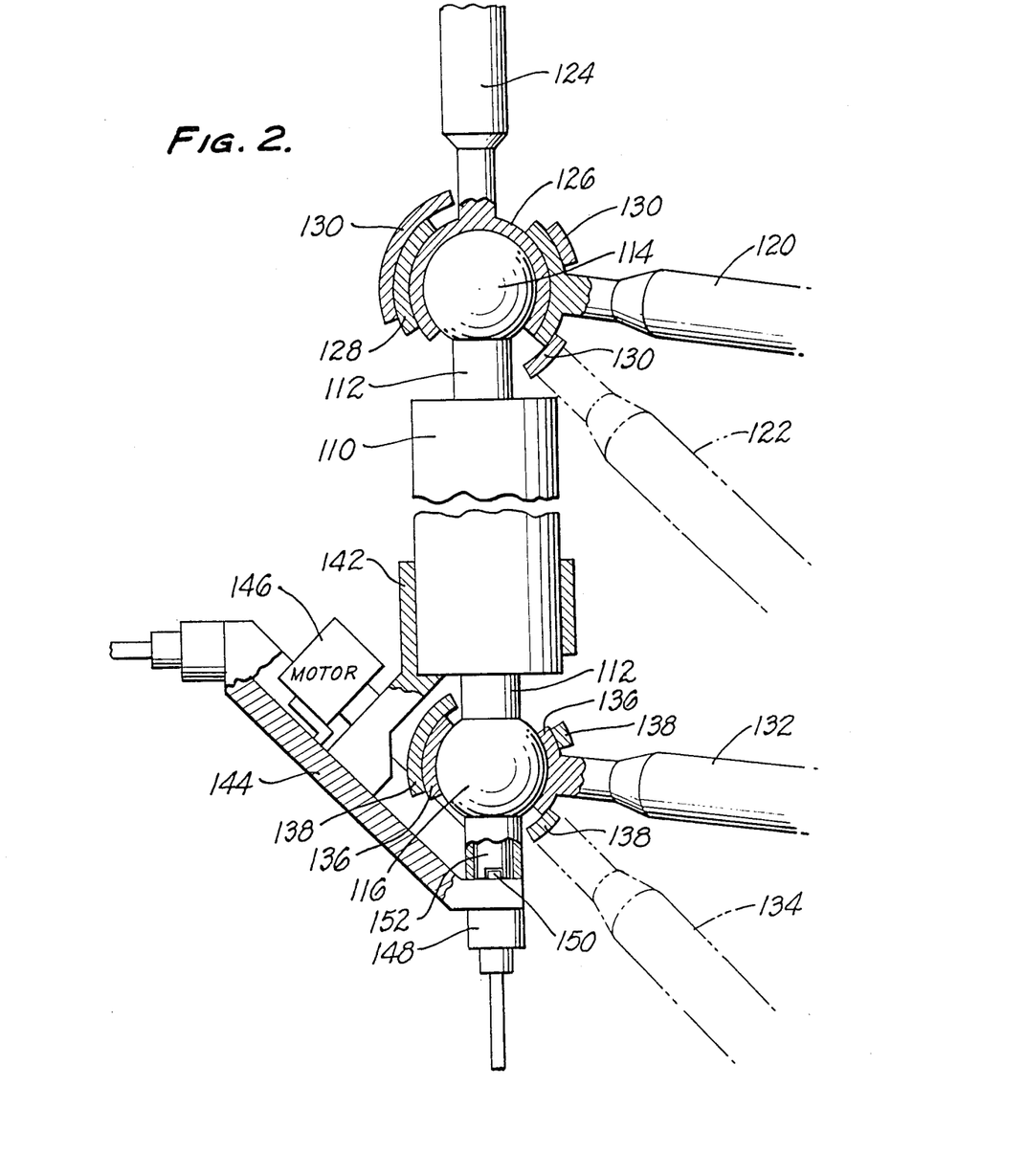
FIG. 2 is a side elevation view in section of an alternate embodiment of the invention.

FIG. 2 shows an alternate embodiment of the coupling means. In FIG. 2, a tool post 112 has an upper ball 114 located on one end thereof. A lower ball 116 is displaced upwardly from the lower end 118 of the tool post 112. A first positioning member 120 and a second positioning member 122 and a further positioning member 124 are all mounted about the ball 114 so as to rotate about a common first center of rotation centered at the center of the ball 114.

Rotation of the positioning members 120, 122 and 124 about the ball 114 is achieved by utilizing a first semispherical casing 126 on the end of the further positioning member 124, a partial spherical casing 128 on the end of first positioning member 120 and a further partial spherical casing 130 on the end of second positioning member 122. The partial spherical casings 128 and 130 have appropriate voids in their spherical surface to allow for extension of the positioning members 120 and 124 from within the interior of these partial spherical casings. The semispherical casing 126 on the further positioning member 124 extends only partly around the upper ball 114 allowing for movement of the tool post 112 about the common center of rotation centered within the ball 114.

In a like manner a third positioning member 132 and a fourth positioning member 134 are pivotally or rotatively attached to the ball 114 utilizing partial spherical casings 136 and 138. This allows for the tool post 112 to extend upwardly from the ball 116 and downwardly from the ball 116. The positioning members 120, 122, 124, 132 and 134 can be indexed against rotation about their elongated axes in the same manner as was described for the positioning member 70.

Schematically depicted in FIG. 2 would be an appropriate drive motor and tool feed and retract mechanism 140 surrounding the tool post 112 and an appropriate bracket 142 from which a tool carousel 144 and its appropriate drive motor 146 are joined to the remainder of the components. A schematic working tool 148 is shown keyed by key 150 to a rotating shaft 152 which coaxially extends through the tool post 112. The rotating shaft 52 would be appropriately rotated and axially moved within the tool post 112 by the drive motor and tool feed mechanism 140. Typically, an air motor or other such device would be utilized within the mechanism 140 to rotate the shaft 152.

As is evident from this specification and the drawings an appropriate working tool, such as working tool 80 of FIG. 1 can be freely positioned in three dimensional space by simply rotating one or more of the recirculating ball nuts 108 by the actuator mechanism 104. At all times tension and compression forces only are transmitted by the positioning members and the recirculating ball nuts 108 through the actuator mechanisms 104 and the gimbals 62 to the support structure 46. Since the actuator mechanisms 104 are freely pivotal within the gimbals 52 and the gimbals themselves are freely pivotal on the support structure 46 there are no bending moments in the robotic device of this invention and because of this the positional accuracies as described are achievable.

Since there are no bending moments in the devices of this invention and since zero backlash devices are utilized for positioning the working tools attached to the devices of the invention, the devices of the invention can be freely rotated in space to fit over, below or to the side of a surface or object which is being worked on. The device of FIG. 1 or any other device of this invention could rotated 90 degrees, 180 degrees or to some other angle and still be fully functional.

As is evident from the various embodiments described, when the devices of the invention are utilized to position a machine tool implement, the machine tool implement can, at all times, be maintained normal to a working surface. The various devices of the invention can also be utilized to position and move other less conventional implements such as laser cutters and the like. For machining, assembly or other functions, a working implement could be augmented with optical or tactile sensors. These sensors could be integrated with necessary CNC control devices to work in concert with the various actuators and the like of the devices of the invention.

For the purpose of illustration, the various positioning members of the devices of the invention have been shown as simple elongated cylindrical elements. It is recgonized that other elements might also be used including but not limited to large diameter cylindrical elements, hollow elements and compound truss devices having at least one component capable of interaction with the appropriate actuator to achieve movement along a linear axis of the element or truss. Additionally, equilibration springs or the like might also be mounted on the positioning members between the implement elements and the support structure.

We claim:

1. A robotic device comprising:
   a support structure;
   an implement element;
   means for moving the implement element in a controlled manner consisting of first and second sets of positioning members each having two members; and a further positioning member so that there are five positioning members; and
   first and second coupling means defining two coupling points;
   said members making up a set of exactly five positioning members;
   said implement element being supported solely by said five members;
   said first set consisting of two elongated positioning members, each pivotally attached to said implement element about a first common center of rotation;
   said second set consisting of two elongate positioning members, each pivotally attached to said implement element about a second common center of rotation distal from said first common center of rotation;
   said further elongated positioning member being pivotally attached to said implement element about said first common center of rotation in association with said members of said first set of positioning members;
   first connecting means for movably attaching each of the members of said first set of positioning members to said support structure, said first connecting means operatively connecting each of said members of said first set of positioning members to said support structure;
   second connecting means for movably attaching each of the members of said second set of positioning members to said support structure, said second connecting means operatively connecting each of said members of said second set of positioning members to said support structure;
   further means for movably attaching said further positioning member to said support structure, said further means operatively connecting said further positioning member to said support structure;
   actuator means for independently moving at least the members of one of said first and second sets of positioning members axially along their elongated axes between said support structure and said implement element whereby the position of said implement element with respect to said support structure is solely controlled by said movement of said five positioning members.

2. The device of claim 1 wherein:
   said first connecting means includes a first plurality of gimbal means equal in number to said number of members of said first set of positioning members, each of said first gimbal means for movably connecting one of said members of said first set of positioning members to said support structure and allowing said members to freely pivot with respect to said support structure;
   said second connecting means includes a second plurality of gimbal means equal in number to said number of members of said second set of positioning members, each of said second gimbal means for movably connecting one of said members of said second set of positioning members to said support structure and allowing said members to freely pivot with respect to said support structure;
   said further means includes a further gimbal means said further gimbal means for movably connecting said further positioning member to said support structure and allowing said further member to freely pivot with respect to said support strure.

3. The device of claim 1 wherein:
   said actuator means further for independently moving the other of said first and second sets of positioning members axially along their elongated axes between said implement element and said support structure.

4. The device of claim 3 wherein:
   said actuator means further for moving said further positioning member axially along its elongated axis between said implement element and said support structure.

5. The device of claim 4 including:
   said first connecting means includes a first plurality of gimbal means equal in number to said number of members of said first set of positioning members, each of said first gimbal means for movably connecting one of said members of said first set of positioning members to said support structure and allowing said members to freely pivot with respect to said support structure;
   said second connecting means includes a second plurality of gimbal means equal in number to said number of members of said second set of positioning members, each of said second gimbal means for movably connecting one of said members of said second set of positioning members to said support structure and allowing said members to freely pivot with respect to said support structure;
   said further means includes a further gimbal means, said further gimbal means for movably connecting said further positioning member to said support structure and allowing said further member to freely pivot with respect to said support structure.

6. The device of claim 5 including:
   each of said members of said first set of positioning members and said further positioning member pivotal about said first common center of rotation;

each of said members of said second set of positioning members pivotal about said second common center of rotation.

7. A robotic device comprising:
a support structure;
a tool carrier for supporting a working tool; and positioning and coupling means for moving the carrier in a controlled manner consisting of exactly five members including
a first triangular support having first and second members, said first triangular support formed in part by said first and second members and in a further part by a first section of said support structure, said first and second members forming side portions of said first triangular support and said first section of said support structure forming a base portion of said first triangular support;
first connecting means for independently operatively connecting each of said first and second members to said first section of said support structure whereby each of said first and second members are independently pivotal respect to said first section of said support structure and each of said members are independently axially movable along an axis of said member with respect to said first section of said support structure;
a second triangular support having third and fourth members said second triangular support formed in part by said third and fourth members and in a further part by a second section of said support structure, said third and fourth members forming side portions of said second triangular support and said second section of said support structure forming a base portion of said second triangular support;
second connecting means for independently operatively connecting each of said third and fourth members to said second section of said support structure whereby each of said third and fourth members are independently pivotal with respect to said second section of said support structure and each of said members are independently axially movable along an axis of said member with respect to said second section of said support structure;
first coupling means for connecting said first triangular support to said tool carrier, said first coupling means operatively connecting the apex of said first triangular support at the junction of said first and second members to said tool carrier, said first coupling means including at least a first coupler and a second coupler, said first coupler attaching to said first member proximal to the apex of said first triangular support, said second coupler attaching to said second member proximal to the apex of said first triangular support, each of said first and second couplers pivotally coupled to said tool carrier about a first common center of rotation;
second coupling means for connecting said second triangular support to said tool carrier, said second coupling means operatively connecting the apex of said second triangular support at the junction of said third and fourth members to said tool carrier, said second coupling means including at least a third coupler and a fourth coupler, said third coupler attaching to said third member proximal to the apex of said second triangular support, said fourth coupler attaching to said fourth member proximal to the apex of said second triangular support, each of said third and fourth couplers pivotally coupled to said tool carrier about a second common center of rotation;
moving means for independently moving said first and said second members with respect to said first section of said support structure and said third and said fourth members with respect to said second section of said support structure; and
further means for moving said tool carrier with respect to said support structure, said further means operatively associated with both said support structure and said tool carrier, moving said tool carrier with respect to said support structure independently from said movement imparted to said tool carrier by said moving means said further means including a fifth member, a fifth member connecting means and a fifth member moving means, said fifth member pivotally coupled to said tool carrier about said first common center of rotation;
said fifth member connecting means for connecting said fifth member to said support structure whereby said fifth member is both pivotally movable and axially movable along an axis of the fifth member with respect to said support structure;
said fifth member moving means for moving said fifth member with respect to said support structure,
said tool carrier being supported solely by said five members.

8. The tool device of claim 7 wherein:
said first connecting means includes a first pivoting means, a first axial movement means, a second pivoting means and a second axial movement means, said first and second pivoting means for providing for pivotal movement of said first and second members respectively with respect to said first section of said support structure, said first and second axial movement means for providing for axial movement of said first and second members respectively with respect to said first section of said support structure;
said first and second pivoting means movably connected to said support structure, said first and second axial movement means connected to said first and second pivoting means respectively, said first and second members movably connecting to said first and second axial movement means respectively;
said second connecting means includes a third pivoting means, a third axial movement means, a fourth pivoting means and a fourth axial movement means, said third and fourth pivoting means for providing for pivotal movement of said third and fourth members respectively with respect to said second section of said support structure, said third and fourth axial movement means for providing for axial movement of said third and fourth members respectively with respect to said second section of said support structure;
said third and fourth pivoting means movably connected to said support structure, said third and fourth axial movement means connected to said third and fourth pivoting means respectively, said third and fourth members movably connecting to said third and fourth axial movement means respectively.

9. The tool device of claim 8 wherein:

said further means includes a fifth member, a fifth pivoting means, a fifth axial movement means and a fifth member moving means;

said fifth pivoting means for providing for pivotal movement of said fifth member with respect to said support structure, said fifth axial movement means for providing axial movement of said fifth member with respect to said support structure; said fifth pivoting means connected to said support structure, said fifth axial movement means connected to said fifth pivoting means, said fifth member movably connected to said fifth axial movement means;

said fifth member moving means for axially moving said fifth member with respect to said support structure;

a fifth member coupling means, said fifth member coupling means attaching to said fifth member distal from said fifth axial means, said fifth member coupling means further movably connecting to said tool carrier.

10. The tool device of claim 9 wherein:

said first, second, third, fourth and fifth pivoting means each comprise gimbal means;

said first, second, third, fourth and fifth axial movement means each comprise a ball screw assembly means and an acturator means for driving said ball screw assembly means;

said first, second, third, fourth and fifth members each including a lead screw located thereon, said lead screws on said respective members operatively associated with said respective ball screw assembly means, so as to move said respective members in response to said respective actuators means driving said respective ball screw assembly means.

* * * * *